E. B. Rowe.
Ceiling Lumber.
Nº 89,172. Patented Apr. 20, 1869.

WITNESSES.
H. C. Ashkettle
Wm A. Morgan

INVENTOR
E. B. Rowe
per Munn & Co
Attys

EBENEZER B. ROWE, OF CHICAGO, ILLINOIS, ASSIGNOR TO THE SOUTH BRANCH PLANING-MILL COMPANY, OF SAME PLACE.

Letters Patent No. 89,172, dated April 20, 1869.

IMPROVEMENT IN MANUFACTURING LUMBER.

The Schedule referred to in these Letters Patent and making part of the same.

*To all whom it may concern:*

Be it known that I, EBENEZER B. ROWE, of Chicago, in the county of Cook, and State of Illinois, have invented a new and useful Improvement in Manufacturing Lumber for Ceiling; and I do hereby declare that the following is a full, clear, and exact description thereof, which will enable those skilled in the art to make and use the same, reference being had to the accompanying drawings, forming part of this specification.

This invention relates to a new and improved method of preparing or manufacturing lumber for ceiling, and for other similar purposes, whereby much labor and expense are saved; and The invention consists in forming two or more grooves and two or more tongues in and on the edges of planks, or boards, and then splitting such pieces by sawing, and making two or more pieces of ceiling thereby, tongued and grooved for use.

Similar letters of reference indicate corresponding parts.

Figure 1:
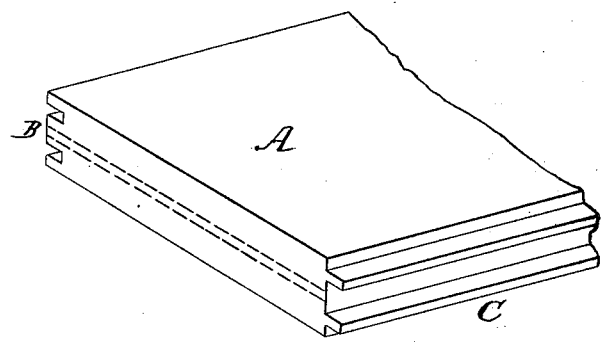
Figure 1 represents a perspective view of a piece of lumber, (a plank, or board,) tongued and grooved, and marked for sawing according to my invention.
Figure 2:
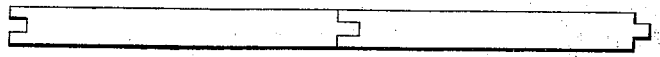
Figure 2 represents the pieces of ceiling thus made put together.

A is the plank, with two grooves on one edge, as seen at B, and with two tongues on the other edge, as seen at C.

In this example of my invention, two grooves and two tongues only are shown, but I do not confine myself to that number, as a thicker plank may be used, and more than two grooves and tongues formed by a single operation if desired, and then the plank can be sawed to the proper thickness, as before described.

By this method of dressing lumber intended for ceiling and similar purposes, much labor and time are saved, as the grooves and the tongues are formed at a single operation, thus greatly reducing the cost to the consumer, and producing by the operation, a superior article for the market.

Having thus described my invention,

I claim as new, and desire to secure by Letters Patent—

The method of forming tongued and grooved ceilings, by forming two or more grooves and two or more tongues on opposite edges of pieces of lumber, and then sawing such plank, or piece of lumber longitudinally into two or more strips of uniform thickness, each having a tongue upon one edge, and a groove upon the other, as herein described.

EBENEZER B. ROWE.

Witnesses:
   A. D. STURTEVANT,
   H. B. ADAMS.